(12) United States Patent
Addala et al.

(10) Patent No.: US 8,271,609 B2
(45) Date of Patent: Sep. 18, 2012

(54) DYNAMIC SERVICE INVOCATION AND SERVICE ADAPTATION IN BPEL SOA PROCESS

(75) Inventors: Raju Addala, Westford, MA (US); Alok Singh, Fremont, CA (US); Shrikant Nene, Fairfield, CT (US); Zeeshan Butt, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 883 days.

(21) Appl. No.: 12/210,657

(22) Filed: Sep. 15, 2008

(65) Prior Publication Data

US 2010/0070553 A1    Mar. 18, 2010

(51) Int. Cl.
  *G06F 15/16* (2006.01)
(52) U.S. Cl. ........ 709/218; 709/200; 709/202; 719/315; 706/47
(58) Field of Classification Search .......... 709/200, 709/202, 218; 719/315; 706/47
See application file for complete search history.

(56) References Cited

U.S. PATENT DOCUMENTS

| | | | |
|---|---|---|---|
| 5,850,518 A | 12/1998 | Northrup | |
| 6,397,254 B1 | 5/2002 | Northrup | |
| 6,421,705 B1 | 7/2002 | Northrup | |
| 6,546,413 B1 | 4/2003 | Northrup | |
| 6,671,713 B2 | 12/2003 | Northrup | |
| 6,671,746 B1 | 12/2003 | Northrup | |
| 6,779,000 B1 | 8/2004 | Northrup | |
| 6,807,636 B2 * | 10/2004 | Hartman et al. | 726/14 |
| 6,922,675 B1 * | 7/2005 | Chatterjee et al. | 705/26.41 |
| 6,922,705 B1 | 7/2005 | Northrup | |
| 7,062,749 B2 | 6/2006 | Cyr et al. | |
| 7,188,158 B1 * | 3/2007 | Stanton et al. | 709/220 |
| 7,535,927 B1 | 5/2009 | Northrup | |
| 7,536,606 B2 * | 5/2009 | Andrews et al. | 714/43 |
| 7,603,674 B2 | 10/2009 | Cyr et al. | |
| 7,774,477 B2 * | 8/2010 | Zintel et al. | 709/227 |
| 7,783,782 B2 * | 8/2010 | Cromp et al. | 709/249 |
| 7,788,338 B2 * | 8/2010 | Savchenko et al. | 709/218 |
| 2002/0103660 A1 * | 8/2002 | Cramon et al. | 705/1 |
| 2003/0172127 A1 | 9/2003 | Northrup | |
| 2003/0204645 A1 * | 10/2003 | Sharma et al. | 709/328 |

(Continued)

OTHER PUBLICATIONS

Box et al, "Web Services Addressing (WS-Addressing)" Aug. 10, 2004, 23 pages, http://www.w3.org/Submission/ws-addressing/#_Toc77464317, printed on Aug. 18, 2009.

(Continued)

*Primary Examiner* — John Follansbee
*Assistant Examiner* — Anthony Mejia
(74) *Attorney, Agent, or Firm* — Kilpatrick Townsend & Stockton LLP

(57) ABSTRACT

Techniques for dynamic service invocation and dynamic service adaptation in the context of a service oriented application. In one set of embodiments, a plurality of mediator services are introduced between the application and a plurality of actual services accessed by the application. The plurality of mediator services are configured to expose a common, abstract operation. At application runtime, the application determines, via a rules engine, a selection of a mediator service, and invokes the abstract operation by sending an invocation message to the selected mediator service. The selected mediator service transforms (i.e., adapts) the message into a format appropriate for invoking an actual operation exposed by an actual service associated with the selected mediator service. The selected mediator service then invokes the actual operation by sending the transformed message to the actual service.

20 Claims, 7 Drawing Sheets

U.S. PATENT DOCUMENTS

| | | | |
|---|---|---|---|
| 2004/0046787 A1* | 3/2004 | Henry et al. | 345/744 |
| 2004/0205765 A1* | 10/2004 | Beringer et al. | 719/311 |
| 2005/0193061 A1* | 9/2005 | Schmidt et al. | 709/204 |
| 2006/0031750 A1* | 2/2006 | Waldorf et al. | 715/501.1 |
| 2006/0036463 A1* | 2/2006 | Patrick et al. | 705/1 |
| 2006/0080117 A1* | 4/2006 | Carr et al. | 705/1 |
| 2006/0106626 A1* | 5/2006 | Jeng et al. | 705/1 |
| 2006/0143229 A1* | 6/2006 | Bou-Ghannam et al. | 707/104.1 |
| 2006/0150156 A1 | 7/2006 | Cyr et al. | |
| 2006/0165105 A1* | 7/2006 | Shenfield et al. | 370/401 |
| 2006/0168132 A1* | 7/2006 | Bunter et al. | 709/219 |
| 2006/0168355 A1* | 7/2006 | Shenfield et al. | 709/250 |
| 2006/0235733 A1* | 10/2006 | Marks | 705/7 |
| 2007/0016429 A1* | 1/2007 | Bournas et al. | 705/1 |
| 2008/0004887 A1* | 1/2008 | Brunswig et al. | 705/1 |
| 2008/0162304 A1* | 7/2008 | Ourega | 705/27 |
| 2008/0183479 A1* | 7/2008 | Iwashita et al. | 705/1 |
| 2009/0031280 A1* | 1/2009 | Koehler | 717/104 |
| 2009/0144729 A1* | 6/2009 | Guizar | 717/176 |
| 2009/0150565 A1* | 6/2009 | Grossner et al. | 709/241 |
| 2009/0158237 A1* | 6/2009 | Zhang et al. | 717/100 |
| 2009/0292797 A1* | 11/2009 | Cromp et al. | 709/223 |
| 2010/0057482 A1* | 3/2010 | Radhakrishnan et al. | 705/1 |
| 2010/0070973 A1 | 3/2010 | Addala et al. | |
| 2010/0313038 A1* | 12/2010 | Bradley et al. | 713/189 |
| 2011/0023071 A1* | 1/2011 | Li et al. | 725/87 |

OTHER PUBLICATIONS

Carey, "Making BPEL Processes Dynamic" Oracle Technology Network, 8 pages, printed on Aug. 18, 2009.

Altenhofen et al., "ASMs in Service Oriented Architectures", Journal of Universal Computer Science, vol. 14, No. 12, 2008, 25 pages.

Hohpe et al., "Messaging Systems" Enterprise Integration Patterns 2004, pp. 57-97, Chapter 3, Pearson Education, Inc, Boston, Massachusetts, 45 pages.

Non-Final Office Action for U.S. Appl. No. 12/212,599 mailed on Dec. 22, 2011, 10 pages.

* cited by examiner

DYNAMIC SERVICE INVOCATION AND SERVICE ADAPTATION IN BPEL SOA PROCESS

BACKGROUND OF THE INVENTION

Embodiments of the present invention relate to service-oriented computing, and more particularly relate to techniques for dynamic service invocation and dynamic service adaptation in the context of a service-oriented application.

In recent years, many organizations have adopted Service-Oriented Architecture (SOA) for building and integrating their business applications. Generally speaking, SOA is a software model that encapsulates business functionality into a collection of modular software components, known as services. Each service exposes a well-defined interface that is independent of the service's underlying implementation (e.g., hardware/software platform, programming language, etc.). Using these interfaces, the various services can interact to provide services to, and consume services from, each other.

One advantage of the SOA paradigm is that business applications can be structured as compositions of one or more component services. These types of applications are referred to herein as service-oriented applications. For example, an order fulfillment application may be configured to access (1) an internal query service for retrieving the details of a customer order, (2) an external credit verification service for checking the customer's credit, (3) an internal inventory service for reserving the items included in the order, and (4) an external shipping service for processing shipment. The structural definition of a service-oriented application (including, for example, the types of services accessed, the sequencing of service operation invocations, and fault handling) is typically expressed in an orchestration language, such as Business Process Execution Language (BPEL). A BPEL-based definition of a service-oriented application is known as a BPEL process.

One limitation with accessing services from a BPEL process is that the links to the services (i.e., partner links) are generally static. In other words, the specific service operation being invoked, as well as the name and location of the service exposing the operation, is statically defined by the process developer at design time. Although this approach may be suitable for smaller or highly targeted systems, in larger, more complex systems this approach can be problematic for several reasons. First, the particular service and/or service operation that needs to be invoked via a partner link may not be known at design time. This may occur if, for example, the BPEL process needs to select a service from among a plurality of services based on one or more runtime attributes. As a result, all of the possible services must be associated with separate partner links, and the business logic for deciding which partner link to use must be built into the BPEL process itself. Second, as service interfaces change or as new services are made available, the BPEL process grows more and more unwieldy because changes to the partner links require modification of the entire process. Third, since the business logic for selecting partner links is embedded within the BPEL process, it cannot be easily changed by users that do not have a sophisticated technical knowledge of BPEL and SOA.

Some of the above problems can be mitigated, to an extent, by using a feature of BPEL known as dynamic binding. Dynamic binding allows the service name and location associated with a partner link to be modified at runtime. However, dynamic binding does not allow dynamic modification of the service operation being invoked via the partner link. Thus, dynamic binding cannot be used to dynamically access different services that expose different operations; rather, all of the services must expose the exact same operation. This is problematic because many third-party services expose operations that are functionally similar, but have different operation names and/or message schemas.

BRIEF SUMMARY OF THE INVENTION

Embodiments of the present invention address the foregoing and other such problems by providing techniques for dynamic service invocation and dynamic service adaptation in the context of a service oriented application (e.g., BPEL process). In one set of embodiments, a plurality of mediator services are introduced between the application and a plurality of actual services accessed by the application. The plurality of mediator services are configured to expose a common, abstract operation. At runtime, the application determines, via a rules engine, a selection of a mediator service for executing the abstract operation, and invokes the abstract operation by sending an invocation message to the selected mediator service. The selected mediator service transforms (i.e., adapts) the message into a format appropriate for invoking an actual operation exposed by an actual service associated with the selected mediator service. The selected mediator service then invokes the actual operation by sending the transformed message to the actual service.

Since embodiments of the present invention enable applications to dynamically access any one of multiple mediator services by calling a single, abstract operation, and since the mediators services are capable of transforming that call to invoke an actual operation exposed by an actual service, embodiments of the present invention overcome the limitations of traditional dynamic binding in BPEL. For example, using embodiments of the present invention, a BPEL process can dynamically invoke different operations exposed by different services via a single partner link. Further, since the logic for transforming abstract operation calls into actual operation calls is encapsulated within the mediator services, there is minimal impact to the calling application if, for example, a new service needs to be accessed, or the interface for an existing service is changed. In these scenarios a new mediator service is simply added to the system, or an affected mediator service is modified. Yet further, by delegating the runtime selection of a mediator service to a data-driven rules engine, embodiments of the present invention allow business analysts and other users unfamiliar with programming concepts to easily configure service selection rules without having to modify any program code.

According to one embodiment of the present invention, a method for dynamic service invocation and dynamic service adaptation in the context of a service-oriented application is provided. The method comprises initiating a plurality of mediator services, wherein each mediator service is associated with an actual service in a plurality of actual services, and wherein the plurality of mediator services are configured to expose a common, abstract operation. The method further comprises, at runtime of the application determining, a selection of a mediator service in the plurality of mediator services for executing the abstract operation, and invoking the abstract operation by sending an invocation message to the selected mediator service. In response to receiving the invocation message, the selected mediator service is configured to transform the invocation message into a format appropriate for invoking an actual operation exposed by an actual service associated with the selected mediator service. The selected mediator service is then configured to invoke the actual operation by sending the transformed invocation message to the actual service.

In one set of embodiments, the service-oriented application is a BPEL process, and the plurality of mediator services and actual services are implemented as web services.

In one set of embodiments, transforming the invocation message comprises mapping a first message schema associated with the abstract operation to a second message schema associated with the actual operation, and transforming data values included in the invocation message into formats expected by the actual operation. The first and second message schemas may be expressed in any one of a number of markup languages, including Extensible Markup Language (XML). In an embodiment, mapping the first message schema to the second message schema comprises mapping a name element in the first message schema identifying a name of the abstract operation to a name element in the second message schema identifying a name of the actual operation. In another embodiment, mapping the first message schema to the second message schema further comprises mapping a parameter element in the first message schema identifying a parameter of the abstract operation to a parameter element in the second message schema identifying a parameter of the actual operation.

In one set of embodiments, the selected mediator service is further configured to receive, in response to invoking the actual operation, an output message from the actual service, and transform the output message into a format expected by the abstract operation. The transformed output message is then sent to the application. In various embodiments, transforming the output message comprises mapping a first message schema associated with the actual operation to a second message schema associated with the abstract operation, and transforming data values included in the output message into formats expected by the abstract operation.

In one set of embodiments, determining a selection of a mediator service from the plurality of mediator services comprises receiving one or more business attributes, and invoking a decision service, wherein the decision service is configured to interoperate with a rules engine to select the mediator service based on the one or more business attributes. Information pertaining to the selected mediator service is then received from the decision service. In an embodiment, the rules engine is distinct from the service-oriented application, and business rules used by the rules engine can be defined declaratively without any program code. In a further embodiment, the information pertaining to the selected mediator service includes a name and address of the selected mediator service.

In one set of embodiments, invoking the abstract operation comprises instantiating a partner link for invoking the abstract operation, instantiating a WS-Addressing EndpointReference variable, initializing a first field of the EndpointReference variable to the name of the selected mediator service, and initializing a second field of the EndpointReference variable to the address of the selected mediator service. Once the EndpointReference variable has been initialized, the variable is assigned to the partner link, and the abstract operation is invoked via the partner link.

In one set of embodiments, the method above further comprises, at runtime of the application, determining a selection of another mediator service in the plurality of mediator services for executing the abstract operation, wherein said another mediator service is associated with another actual service, and wherein said another actual service exposes another actual operation that is distinct from the actual operation exposed by the actual service; and invoking the abstract operation by sending another invocation message to said another mediator service. In response to receiving said another invocation message, said another mediator service is configured to transform said another invocation message into a format appropriate for invoking said another actual operation exposed by an said actual service. Said another mediator service is then configured to invoke said another actual operation by sending the transformed version of said another invocation message to said another actual service.

In one set of embodiments, transforming said another invocation message comprises mapping a first message schema associated with the abstract operation to a second message schema associated with said another actual operation, and transforming data values included in said another invocation message into formats expected by said another actual operation.

According to another embodiment of the present invention, a system for performing dynamic service invocation and dynamic service adaptation in the context of a service-oriented application is provided. The system comprises one or more first servers configured to run a plurality of mediator services, wherein each mediator service is associated with an actual service in a plurality of actual services, and wherein the plurality of mediator services are configured to expose a common, abstract operation. The system further comprises a second server configured to run the service-oriented application, wherein the application is configured to, at runtime, determine a selection of a mediator service in the plurality of mediator services for executing the abstract operation, and invoke the abstract operation by sending an invocation message to the selected mediator service. In response to receiving the invocation message, the selected mediator service is configured to transform the invocation message into a format appropriate for invoking an actual operation exposed by an actual service associated with the selected mediator service. The selected mediator service is then configured to invoke the actual operation by sending the transformed invocation message to the actual service.

In one set of embodiments, the system above further comprises a third server configured to run a decision service, wherein the decision service is configured to receive, from the application, one or more business attributes, and interoperate with a rules engine to select the mediator service based on the one or more business attributes. Information pertaining to the selected mediator service is then sent to the application.

According to yet another embodiment of the present invention, a machine-readable medium having stored thereon program code for performing dynamic service invocation and dynamic service adaptation in the context of a service-oriented application is provided. The program code comprises code for a plurality of mediator services, wherein each mediator service is associated with an actual service in a plurality of actual services, and wherein the plurality of mediator services are configured to expose a common, abstract operation. The program code further comprises code for the service-oriented application, wherein the application is configured to, at runtime, determine a selection of a mediator service in the plurality of mediator services for executing the abstract operation, and invoke the abstract operation by sending an invocation message to the selected mediator service. In response to receiving the invocation message, the selected mediator service is configured to transform the invocation message into a format appropriate for invoking an actual operation exposed by an actual service associated with the selected mediator service. The selected mediator service is then configured to invoke the actual operation by sending the transformed invocation message to the actual service.

A further understanding of the nature and advantages of the embodiments disclosed herein may be realized by reference to the remaining portions of the specification and the attached drawings.

BRIEF DESCRIPTION OF THE DRAWINGS

Various embodiments in accordance with the present invention will be described with reference to the drawings, in which.

In the drawings, the use of like reference numbers in different drawings indicates similar components.

DETAILED DESCRIPTION OF THE INVENTION

In the following description, for the purposes of explanation, numerous specific details are set forth in order to provide an understanding of the present invention. It will be apparent, however, to one skilled in the art that the present invention may be practiced without some of these specific details.

Embodiments of the present invention provide a framework for dynamic service invocation and dynamic service adaptation in the context of a service-oriented application (e.g., a BPEL process). In particular, this framework includes (1) a data-driven mechanism for determining an appropriate service to invoke at runtime of the application, (2) a means for dynamically invoking an operation exposed by the service, where the invocation call is dynamically transformed (i.e., adapted) to match the message schema supported by the service.

In a conventional BPEL process, a limited form of dynamic service invocation can be achieved by using dynamic binding to change the service name and service location associated with a partner link at runtime. However, dynamic binding does not allow the operation invoked via the partner link (and its associated message schema) to be modified. Embodiments of the present invention overcome this problem by introducing mediator services between the BPEL process and actual services accessed by the process. Each mediator service is configured to receive an abstract invocation message from the BPEL process and transform that message into a format appropriate for invoking an actual operation exposed by an actual service. The transformed message is then forwarded to the actual service to invoke the actual operation.

The techniques of the present invention have several advantages. First, these techniques enable a BPEL process to dynamically invoke any type of operation exposed by any service, regardless of operation's name and message schema. Second, this approach improves the maintainability of the BPEL process because all of the transformation logic is encapsulated in the mediator services. Thus, if a new service is made available or if the interface of an existing service is changed, only the affected mediator service(s), rather than the BPEL process, needs to be modified. Third, these techniques can be easily augmented with a data-driven rules engine for selecting the appropriate service to be invoked. This allows users who are unfamiliar to with programming to create and change the business rules governing service selection (via the rules engine) without having to write program code.

Figure 1:
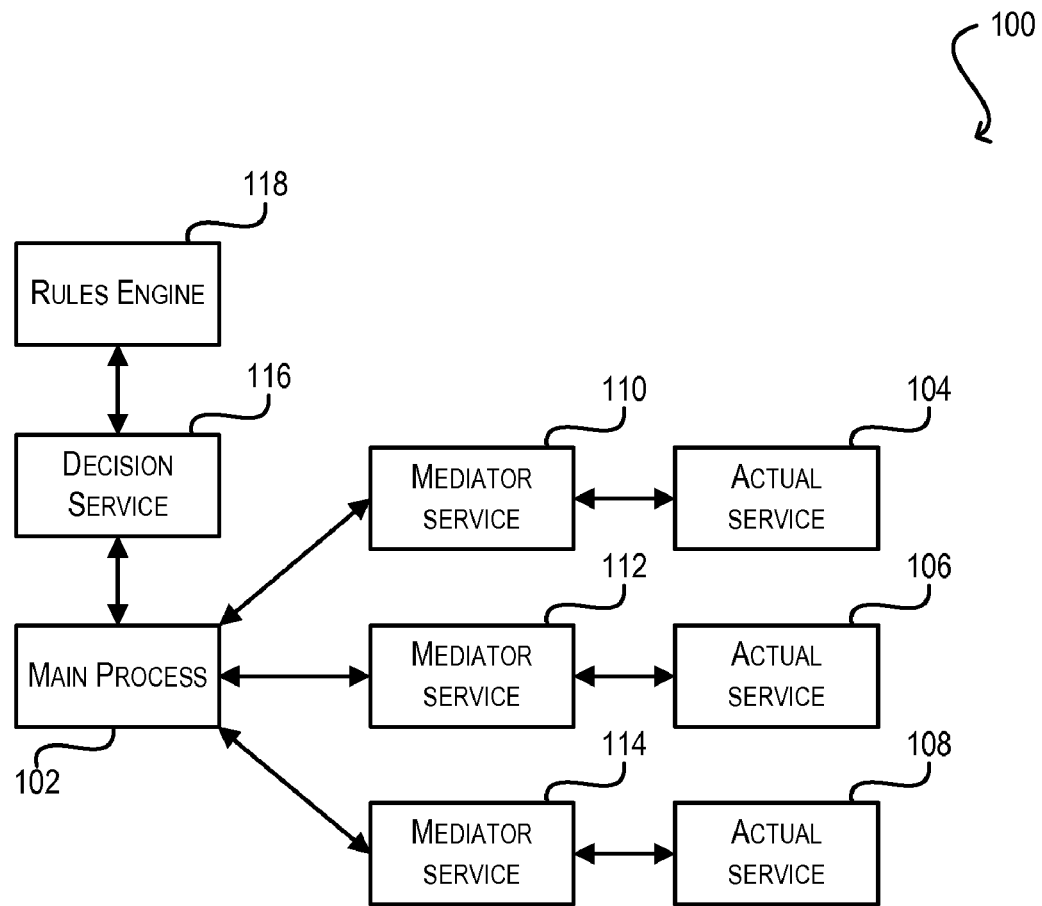
FIG. 1 is a simplified block diagram illustrating functional components of a service-oriented system in accordance with an embodiment of the present invention

FIG. 1 is a simplified block diagram illustrating functional components of a service-oriented system 100 in accordance with an embodiment of the present invention. As shown, system 100 includes a main process 102 and three "actual" services 104, 106, 108. Main process 102 is a service-oriented application that is configured to interact with one or more services. In an exemplary embodiment, main process 102 a BPEL process. Actual services 104, 106, 108 are services that are accessed by main process 102. In an exemplary embodiment, actual services 104, 106, 108 are services that need to be dynamically invoked by main process 102 in order to carry out some business function. For the purposes of the present disclosure, assume main process 102 is an order fulfillment application and actual services 104, 106, 108 are three different shipping services provided by UPS, FedEx, and DHL respectively. In order to process an order shipment, the order fulfillment application must dynamically invoke operations exposed by one of the three shipping services.

To facilitate the dynamic invocation of actual services 104, 106, 108, system 100 includes three corresponding mediator services 110, 112, 114. Mediator services 110, 112, 114 do not execute any business functionality on their own; rather they are responsible for routing and transforming messages sent between main process 102 and actual services 104, 106, 108. More specifically, mediator services 110, 112, 114 are configured to receive a message for invoking an abstract operation from main process 102, transform that message into a format appropriate for invoking an actual operation exposed by a respective actual service (104, 106, or 108), and invoke the actual operation by sending the transformed message to the respective actual service. The interactions between main process 102, mediator services 110, 112, 114, and actual services 104, 106, 108 are described in further detail below.

In various embodiments, system 100 may also include a decision service 116 and a rules engine 118. Decision service 116 and rules engine 118 are responsible for selecting, on behalf of main process 102, a particular mediator service (and thus, a particular actual service) to access at runtime. In an exemplary embodiment, rules engine 118 is implemented as a standalone, data-driven rules component, such as Oracle Business Rules™ available from Oracle Corporation. This enables users to define the business rules governing service selection in a declarative manner, and allows the rules to be modified without stopping main process 102. The interactions between main process 102, decision service 116, and rules engine 118 are described in further detail below.

It should be appreciated that FIG. 1 illustrates a particular functional configuration of a service-oriented system according to an embodiment of the present invention. Other configurations are possible according to alternative embodiments. For example, although only three mediator services and three actual services are depicted, any number of mediator services and actual services may be supported. One of ordinary skill in the art would recognize many variations, modifications, and alternatives.

Figure 2:
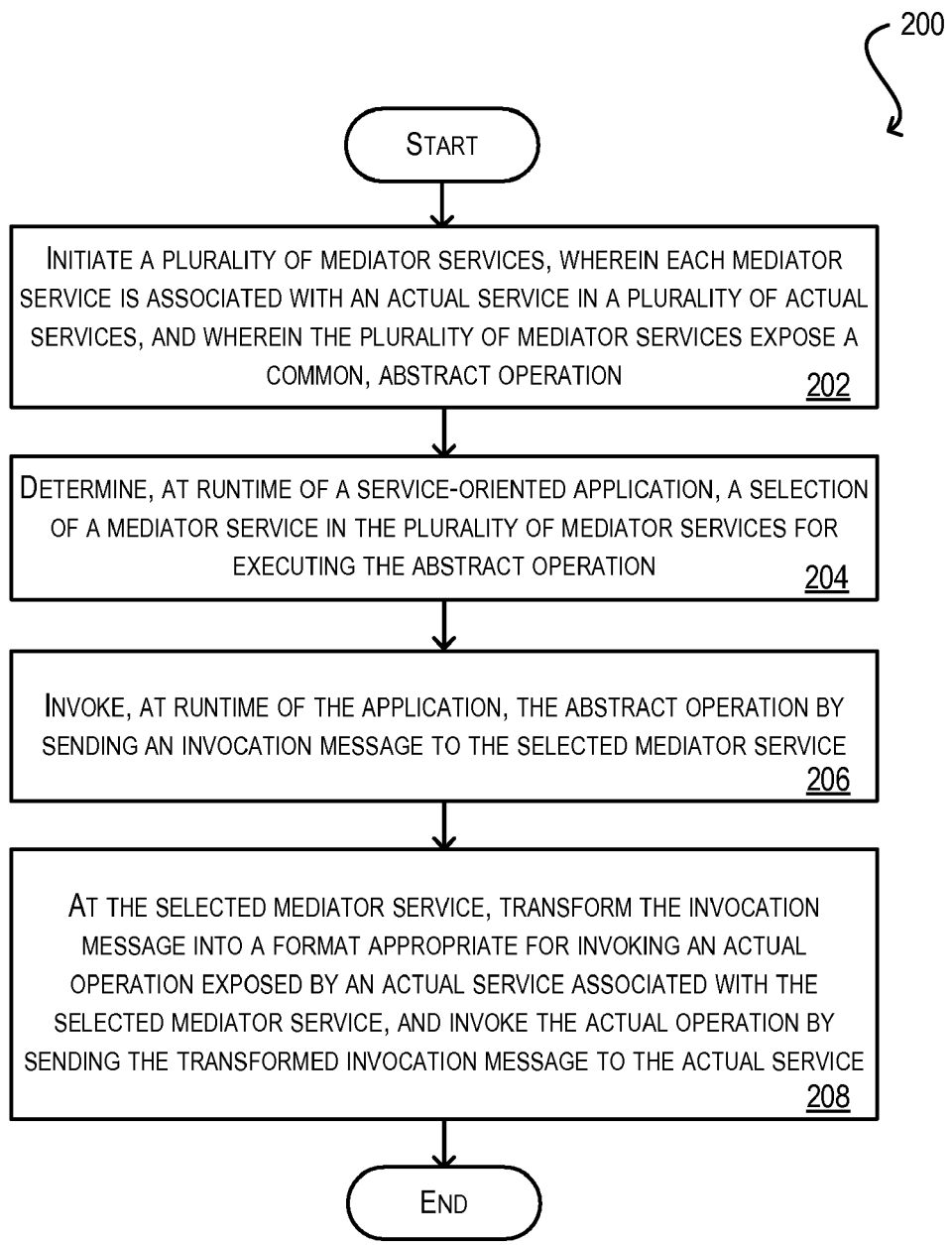
FIG. 2 is a flowchart illustrating steps performed in enabling dynamic service invocation and dynamic service adaptation in accordance with an embodiment of the present invention.

FIG. 2 is a flowchart 200 illustrating steps performed in enabling dynamic service invocation and dynamic service adaptation in accordance with an embodiment of the present invention. In particular, flowchart 200 illustrates steps that may be performed by main process 102 and mediator services 110, 112, 114 for dynamically invoking operations exposed by actual services 104, 106, 108.

At step 202, a plurality of mediator services (e.g., mediator services 110, 112, 114) are initiated, where each mediator service is associated with an actual service in a plurality of actual services (e.g., actual services 104, 106, 108). In various embodiments, the mediator services expose a common, abstract operation that corresponds to actual operations exposed by the actual services. In the example of FIG. 1, mediator services 110, 112, 114 may expose a common, abstract operation called "calculateShipping" that is used by main process 102 to calculate the shipping cost of a particular order. This abstract operation may, in turn, correspond to an actual operation called "calculateShipping_UPS" exposed by actual service 104, an actual operation called "calculateShipping_FedEx" exposed by actual service 106, and an actual operation called "calculateShipping_DHL" exposed by actual service 108.

At step 204, a service-oriented application (e.g., main process 102) determines, at runtime, a selection of a mediator service in the plurality of mediator services for executing the abstract operation. Since each mediator service is associated with a different actual service, this step is analogous to determining a selection of an actual service for executing a corresponding actual operation. Typically, this determination is made based on one or more business attributes. For example, if a business attribute indicates that an order should be shipped via UPS, main process 102 will select mediator service 110, which is associated with the actual shipping service provided by UPS (i.e., actual service 104). Similarly, if the business attribute indicates that an order should be shipped via FedEx, main process 102 will select mediator service 112, which is associated with the actual shipping service provided by FedEx (i.e., actual service 106). In one set of embodiments, this determination is performed via a separate decision service and rules engine, such as decision service 116 and rules engine 118. Alternatively, this determination may be performed using logic embedded in the application itself.

Once a service selection has been made, the application invokes the abstract operation by sending an invocation message to the selected mediator service (step 206). In the case of BPEL process, this invocation may be performed by instantiating a partner link, binding the name and location of the selected mediator service to the partner link, and invoking the abstract operation via the partner link. This process is described in further detail with respect to FIG. 5 below.

In response to receiving the invocation message, the selected mediator service is configured to transform the message into a format appropriate for invoking an actual operation exposed by an associated actual service (step 208). The actual operation will then be invoked by sending the transformed invocation message to the actual service. For example, assume mediator service 110 is selected to execute the abstract "calculateShipping" operation, and receives an invocation message from main process 102. In this scenario, mediator service 110 will transform the invocation message into a format appropriate invoking the actual operation "calculateShipping_UPS" exposed by actual service 104, and then invoke the "calculateShipping_UPS" operation by sending the transformed invocation message to actual service 104. Thus, mediator service 110 can be considered an abstraction layer because it hides the details of the "calculateShipping_UPS" operation from main process 102; the main process need only invoke the singular "calculateShipping" operation and the mediator service will adapt the invocation message as needed to conform to the interface of its corresponding actual service.

In most cases, the actual operations exposed by each of the actual services 104, 106, 108 will be associated with different message types, or schemas. These schemas (typically expressed in Extensible Markup Language, or XML) define the structure of messages understood by the services. Accordingly, the transformation described in step 208 will generally include mapping various elements/attributes (e.g., operation name, parameter name, parameter type, etc.) of the message schema associated with the abstract operation to corresponding elements/attributes of the message schema associated with the actual operation. In various embodiments, the transformation may also include converting data values in the invocation message (e.g., dates, currency values, country codes, etc.) into formats expected by the actual operation.

It should be appreciated that the steps illustrated in FIG. 2 provide a particular method for enabling dynamic service invocation and dynamic service adaptation according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular application. One of ordinary skill in the art would recognize many variations, modifications, and alternatives.

Figure 3:
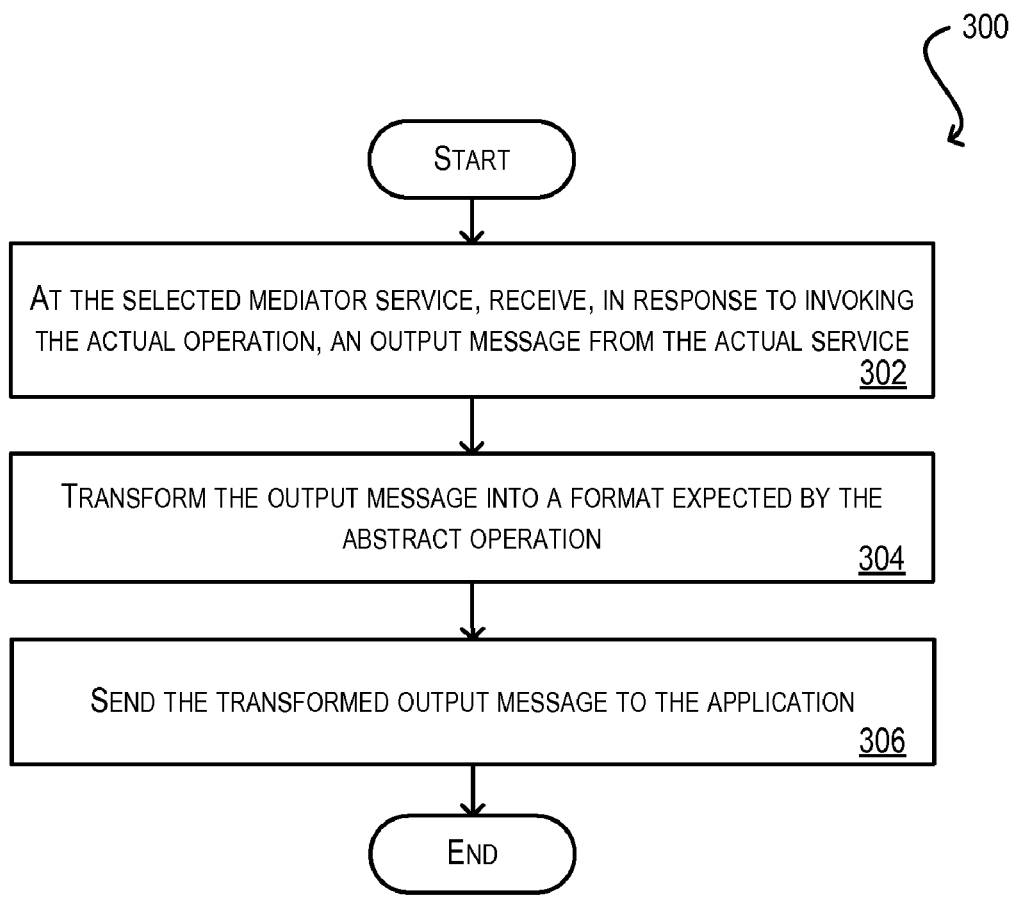
FIG. 3 is a flowchart illustrating steps performed by a mediator service in processing an output message generated by an actual service in accordance with an embodiment of the present invention.

In some cases, the actual operation invoked at step 208 of FIG. 2 will return an output message to the caller (e.g., the selected mediator service). For example, the "calculateShipping_UPS" operation exposed by actual service 104 may be configured to return an output message including a calculated shipping cost. FIG. 3 is a flowchart 300 illustrating steps performed by the selected mediator service in processing this output message in accordance with an embodiment of the present invention.

At step 302, the output message is received at the selected mediator service in response to invoking the actual operation. Since this output message must be routed back to the original calling application (i.e., the service-oriented application), the selected mediator service transforms the output message into a format expected by the service-oriented application (step 304). Generally speaking, this transformation will correspond to the inverse of the transformation performed at step 208 of FIG. 2. For example, this transformation may include mapping the message schema associated with the actual operation back to the message schema associated with the abstract operation. This transformation may further include converting data values included in the output message into formats expected by the abstract operation.

Once the output message is appropriately transformed, it is sent to the service-oriented application (step 306).

It should be appreciated that the steps illustrated in FIG. 3 provide a particular method for processing an output message generated by an actual service according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular application. One of ordinary skill in the art would recognize many variations, modifications, and alternatives.

Figure 4:
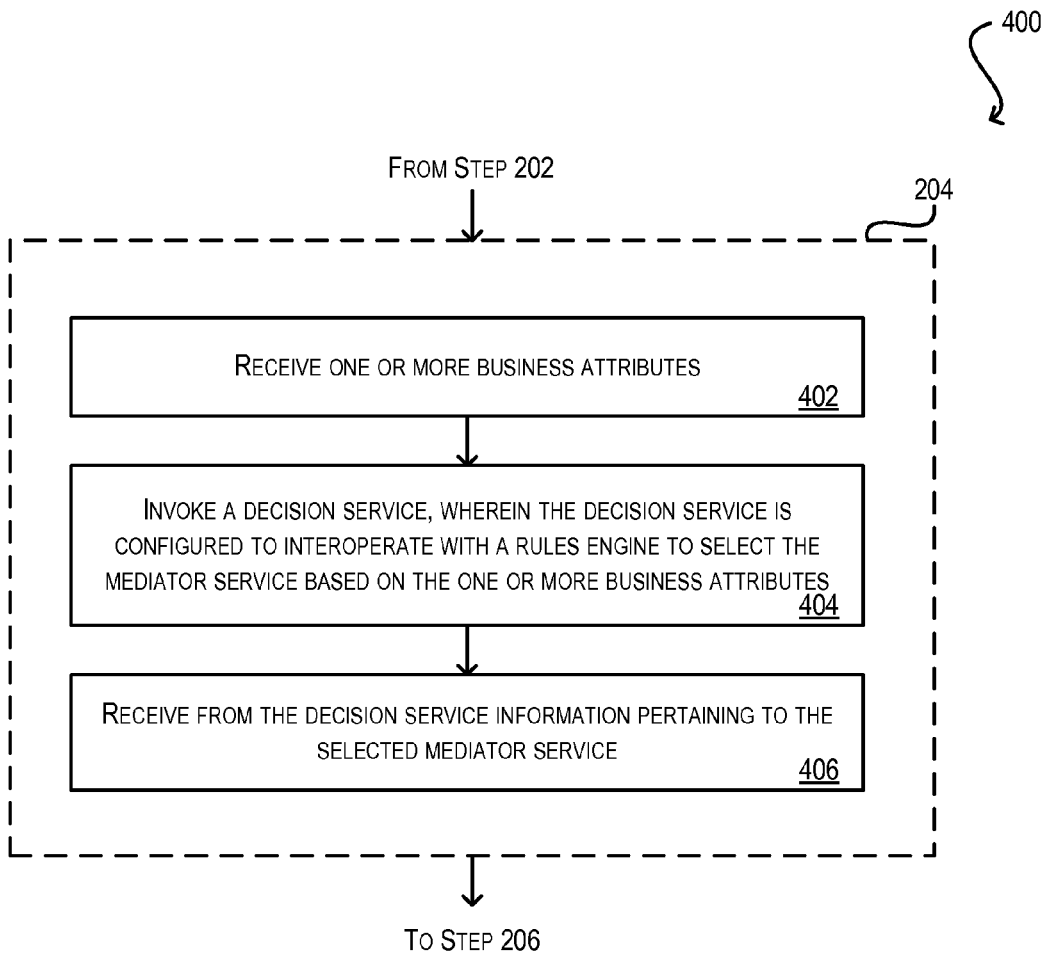
FIG. 4 is a flowchart illustrating steps performed in determining a selection of a mediator service in accordance with an embodiment of the present invention.

FIG. 4 is a flowchart 400 illustrating steps performed by a service-oriented application in determining a selection of a mediator service in accordance with an embodiment of the present invention. As described with respect to FIG. 1, main process 102 may interact with a decision service 116 and rules engine 118 to determine which mediator service/actual service to dynamically invoke at runtime. This process is captured in flowchart 400. In various embodiments, the processing of flowchart 400 may be performed as part of step 204 of FIG. 2.

At step 402, one or more business attributes are received. The one or more business attributes may be received, for example, from a user at runtime of the service-oriented application. Alternatively, the one or more business attributes may be internally determined by the application. At step 404, a decision service (e.g., decision service 116) is invoked, where the decision service is configured to interoperate with a rules engine (e.g., rules engine 118) to select a mediator service based on the one or more business attributes. Generally speaking, the rules engine is configured to store one or more business rules governing service selection. In an exemplary embodiment, the rules engine is implemented as a standalone, data-driven rules component such as Oracle Business Rules™, available from Oracle Corporation. This type of implementation enables business analysts to manage the business rules without modifying program code, and allows the business rules to be modified without stopping the service-oriented application.

At step 406, information pertaining to the selected mediator service is received from the decision service. This information may include, for example, the name and address of the selected mediator service. As described in further detail below, this information is used by the service-oriented application to dynamically access the selected service.

It should be appreciated that the steps illustrated in FIG. 4 provide a particular method for selecting an mediator service according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular application. One of ordinary skill in the art would recognize many variations, modifications, and alternatives.

Figure 5:
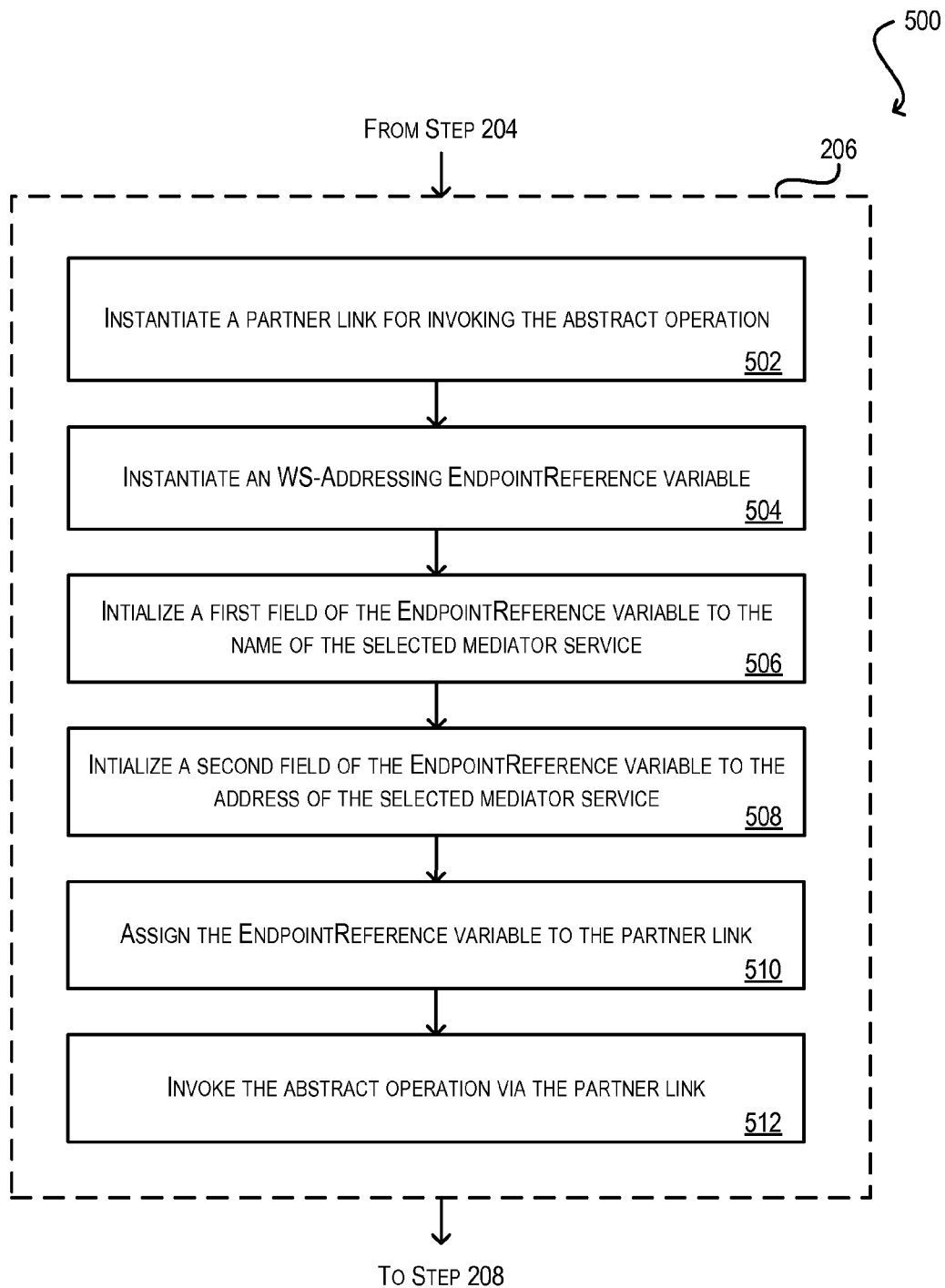
FIG. 5 is a flowchart illustrating steps performed in invoking an abstract operation via a partner link in accordance with an embodiment of the present invention.

FIG. 5 is a flowchart 500 illustrating steps performed in dynamically invoking an abstract operation exposed by a mediator service in accordance with an embodiment of the present invention. In particular, flowchart 500 illustrates steps that may be performed by a BPEL process in carrying out step 206 of FIG. 2.

At step 502, a partner link is instantiated. A partner link is a BPEL construct that is used to invoke an operation exposed by a particular service. In the processing of flowchart 500, the partner link is instantiated for the purpose of invoking the abstract operation exposed by the selected mediator service. However, since the selected mediator service is not known until runtime, the partner link must be dynamically modified to properly reference the selected mediator service.

To accomplish this, a WS-Addressing EndpointReference variable is instantiated (step 504). The EndpointReference variable is a BPEL construct that is used to describe a service endpoint (i.e., service destination). The EndpointReference variable is then initialized with information (e.g., name, location, etc.) pertaining to the selected mediator service (steps 506, 508). In various embodiments, this information corresponds to the information received from the decision service in step 406 of FIG. 4.

Once the EndpointReference variable has been appropriately initialized, the variable is assigned to the partner link (step 510). This causes the partner link to point to the selected mediator service. The abstract operation exposed by the selected mediator service is then invoked via the partner link (step 512).

It should be appreciated that the steps illustrated in FIG. 5 provide a particular method for dynamically invoking an abstract operation exposed by a mediator service according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular application. One of ordinary skill in the art would recognize many variations, modifications, and alternatives.

In one embodiment, the mediator services and actual services are implemented as Web services. In other embodiments, the mediator services and actual service may be implemented as any type of service that conforms to the SOA paradigm.

Figure 6:
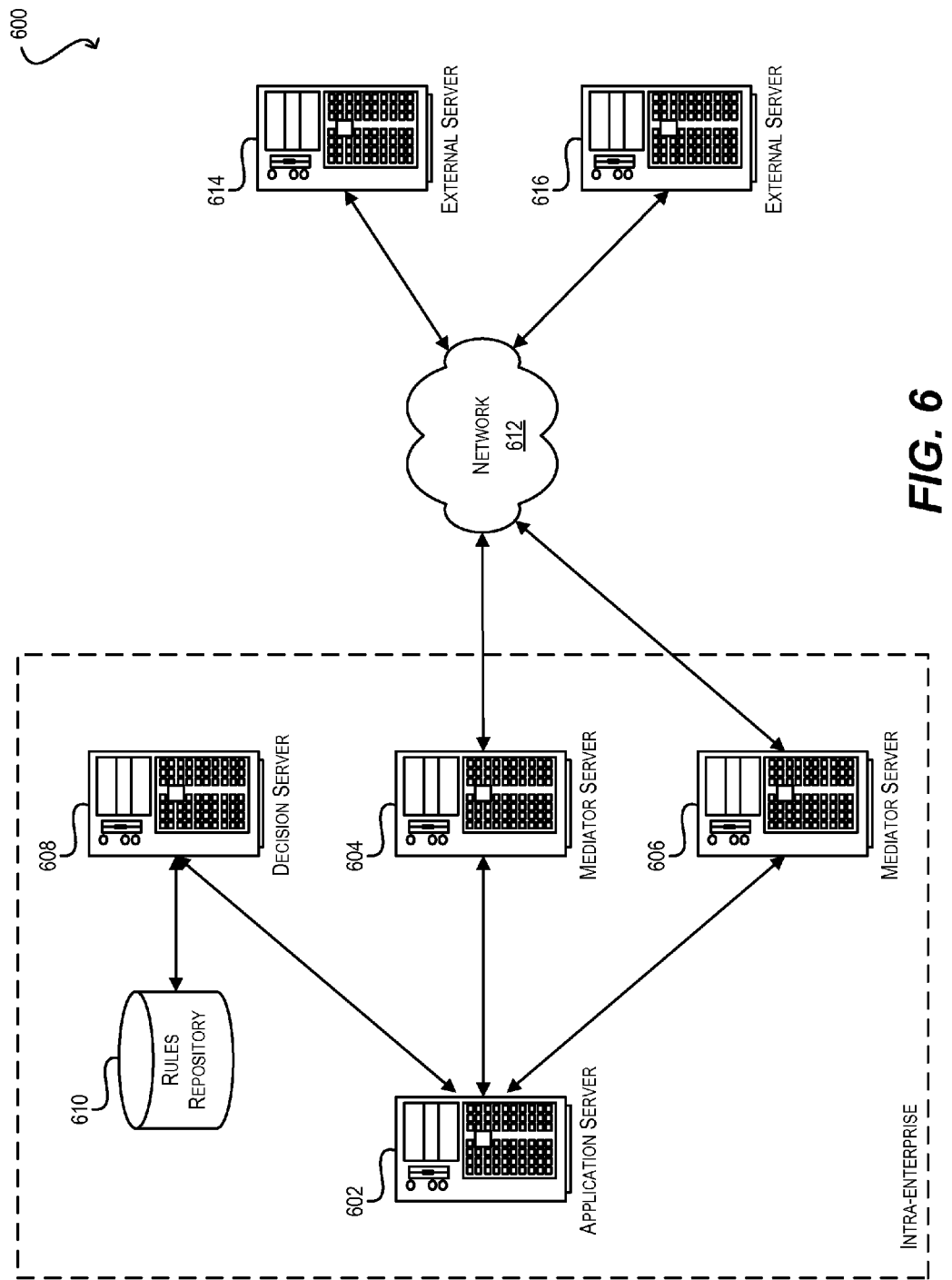
FIG. 6 is a simplified block diagram illustrating a system environment that may be used in accordance with an embodiment of the present invention.

FIG. 6 is a simplified block diagram illustrating components of a system environment 600 that may be used to implement embodiments of the present invention. As shown, system environment 600 includes one or more server computers 602, 604, 606, 608, 614, 616 which may be general purpose computers, specialized server computers (i.e., PC servers, UNIX servers, mid-range servers, mainframe computers rack-mounted servers, etc.), server farms, server clusters, or any other appropriate arrangement and/or combination. In various embodiments, servers 602, 604, 606, 608, 614, 616 are adapted to run one or more services or software applications described in the foregoing disclosure. For example, application server 602 may be configured to run main process 102, mediator servers 604, 606 may be configured to run mediator services 110, 112, 114, decision server 608 may be configured to run decision service 116 and rules engine 118, and external servers 614, 616 may be configured to run actual services 104, 106, 108. It should be appreciates that system environment 600 illustrates a particular configuration of servers, and other configurations are also within the scope of the present invention. For example, although only two mediator servers and only two external servers are shown, any number of such servers may be supported. Further, the function of various servers may, in certain embodiments, be consolidated into a single server. Yet further, although servers 602, 604, 606, 608 are shown as being "intra-enterprise" and servers 614, 616 are shown as being "extra-enterprise," any of the servers may be situated within, or outside, the scope of an enterprise.

Each server 602, 604, 606, 608, 614, 616 is configured to run an operating system, such as Microsoft Windows XP or Vista, Apple OSX, and/or UNIX-based operating systems (including without limitation the variety of GNU/Linux operating systems). Servers 602, 604, 606, 608, 614, 616 may also run any of a variety of additional server applications and/or mid-tier applications, including the services described herein. In one set of embodiments, mediator services 110, 112, 114 and actual services 104, 106, 108 are implemented as Web-based services. In these embodiments, servers 602, 604, 606, 608, 614, 616 may be configured to run one or more HTTP servers.

As shown, system environment 600 includes a network 612. Network 612 may be any type of network familiar to those skilled in the art that can support data communications using any of a variety of commercially-available protocols, including without limitation TCP/IP, SNA, IPX, AppleTalk, and the like. Merely by way of example, network 612 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 600 may also include one or more databases 610. For instance, databases 610 may include a rules repository configured to store business rules used by rules engine 118 to select a service to invoke at application runtime. Databases 610 may reside in a variety of locations. By way of example, one or more of databases 610 may reside on a storage medium local to (and/or resident in) one or more of the servers 602, 604, 606, 608, 614, 616. Alternatively, databases 610 may be remote from any or all of the servers 602, 604, 606, 608, 614, 616, and/or in communication (e.g., via network 612) with one or more of these. In one set of embodiments, databases 612 may reside in a storage-area network (SAN) familiar to those skilled in the art. Similarly, any necessary files for performing the functions attributed to the servers 602, 604, 606, 608, 614, 616 may be stored locally on the respective server and/or remotely, as appropriate. In one set of embodiments, databases 612 may include relational databases, such as Oracle 10g, that are adapted to store, update, and retrieve data in response to SQL-formatted commands.

Figure 7:
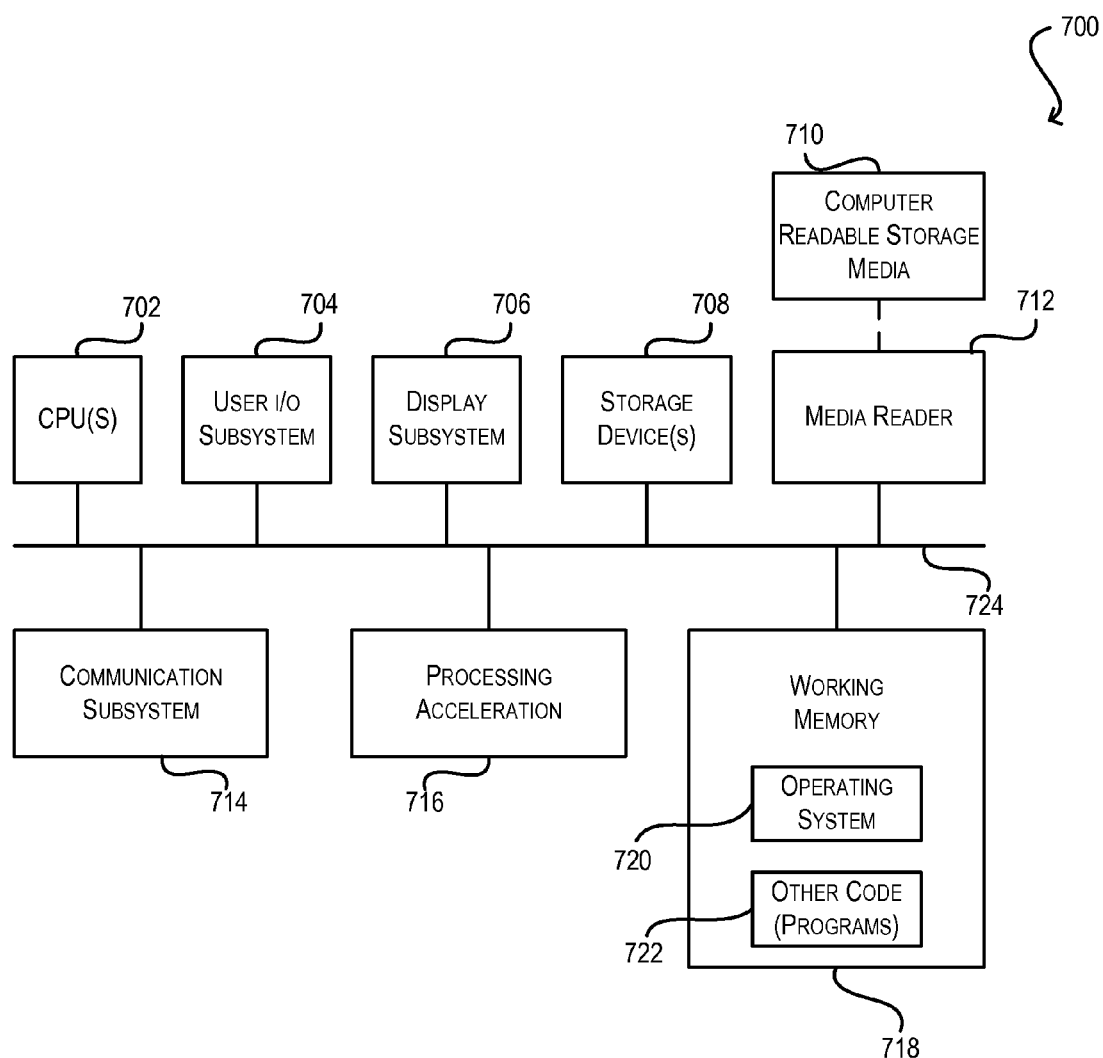
FIG. 7 is a simplified block diagram illustrating a computer system that may be used in accordance with an embodiment of the present invention.

FIG. 7 illustrates an exemplary computer system 700 that may be used in accordance with embodiments of the present invention. In various embodiments, computer system 700 may be used to implement any of the servers 602, 604, 606, 608, 614, 616 described above. Computer system 700 is shown comprising hardware elements that may be electrically coupled via a bus 724. The hardware elements may include one or more central processing units (CPUs) 702, one or more input devices 704 (e.g., a mouse, a keyboard, etc.), and one or more output devices 706 (e.g., a display device, a printer, etc.). Computer system 700 may also include one or more storage devices 708. By way of example, the storage device(s) 708 may include devices such as disk drives, optical storage devices, and solid-state storage devices such as a random access memory (RAM) and/or a read-only memory (ROM), which can be programmable, flash-updateable and/or the like.

Computer system 700 may additionally include a computer-readable storage media reader 712, a communications subsystem 714 (e.g., a modem, a network card (wireless or wired), an infra-red communication device, etc.), and working memory 718, which may include RAM and ROM devices as described above. In some embodiments, computer system 700 may also include a processing acceleration unit 716, which can include a digital signal processor (DSP), a special-purpose processor, and/or the like.

Computer-readable storage media reader 712 can further be connected to a computer-readable storage medium 710, together (and, optionally, in combination with storage device(s) 708) comprehensively representing remote, local, fixed, and/or removable storage devices plus storage media for temporarily and/or more permanently containing computer-readable information. Communications system 714 may permit data to be exchanged with network 612 and/or any other computer described above with respect to system environment 600.

Computer system 700 may also comprise software elements, shown as being currently located within working memory 718, including an operating system 720 and/or other code 722, such as code for main process 102, mediator services 110, 112, 114, decision service 116, rules engine 118, and/or actual services 104, 106, 108. It should be appreciated that alternative embodiments of computer system 700 may have numerous variations from that described above. For example, customized hardware might also be used and/or particular elements might be implemented in hardware, software, or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for dynamic service invocation and dynamic service adaptation in the context of a service-oriented application of a business process execution language (BPEL), the method comprising:
   initiating a plurality of mediator services, wherein each mediator service is associated with an actual service in a plurality of actual services, and wherein the plurality of mediator services are configured to expose a common, abstract operation;
   determining, at runtime of the application, a selection of a mediator service in the plurality of mediator services for executing the abstract operation; and invoking, at runtime of the application, the abstract operation by sending an invocation message to the selected mediator service, wherein the BPEL process is enabled to dynamically invoke any type of operation exposed by any of the plurality of mediator services, regardless of the abstract operation's name and message schema, and wherein all transformation logic of the BPEL process is encapsulated in the plurality of mediator services such that when a new service is made available or when an interface of an existing service is changed, only the affected of the plurality of mediator services, rather than the BPEL process, is required to be modified, and wherein, in response to receiving the invocation message, the selected mediator service is configured to:

transform the invocation message into a format appropriate for invoking an actual operation exposed by an actual service associated with the selected mediator service; and invoke the actual operation by sending the transformed invocation message to the actual service.

2. The method of claim 1, wherein transforming the invocation message comprises mapping a first message schema associated with the abstract operation to a second message schema associated with the actual operation.

3. The method of claim 2, wherein the first and second message schemas are expressed in Extensible Markup Language (XML).

4. The method of claim 2, wherein mapping the first message schema to the second message schema comprises mapping a name element in the first message schema identifying a name of the abstract operation to a name element in the second message schema identifying a name of the actual operation.

5. The method of claim 4, wherein mapping the first message schema to the second message schema further comprises mapping a parameter element in the first message schema identifying a parameter of the abstract operation to a parameter element in the second message schema identifying a parameter of the actual operation.

6. The method of claim 2, wherein transforming the invocation message further comprises transforming data values included in the invocation message into formats expected by the actual operation.

7. The method of claim 1, wherein the selected mediator service is further configured to:

receive, in response to invoking the actual operation, an output message from the actual service;

transform the output message into a format expected by the abstract operation; and send the transformed output message to the application.

8. The method of claim 7, wherein transforming the output message comprises mapping a first message schema associated with the actual operation to a second message schema associated with the abstract operation.

9. The method of claim 7, wherein transforming the output message further comprises transforming data values included in the output message into formats expected by the abstract operation.

10. The method of claim 1, wherein determining a selection of a mediator service from the plurality of mediator services comprises:

receiving one or more business attributes;

invoking a decision service, wherein the decision service is configured to interoperate with a rules engine to select the mediator service based on the one or more business attributes; and receiving, from the decision service, information pertaining to the selected mediator service.

11. The method of claim 10, wherein the rules engine is distinct from the service-oriented application, and wherein business rules used by the rules engine can be defined declaratively without any program code.

12. The method of claim 10, wherein the information pertaining to the selected mediator service includes a name and address of the selected mediator service.

13. The method of claim 12, wherein invoking the abstract operation comprises:

instantiating a dynamic partner link for invoking the abstract operation;

instantiating a WS-Addressing EndpointReference variable;

initializing a first field of the WS-Addressing EndpointReference variable to the name of the selected mediator service;

initializing a second field of the WS-Addressing EndpointReference variable to the address of the selected mediator service;

assigning the WS-Addressing EndpointReference variable to the dynamic partner link; and invoking the abstract operation via the dynamic partner link.

14. The method of claim 1 further comprising:

determining, at runtime of the application, a selection of another mediator service in the plurality of mediator services for executing the abstract operation, wherein said another mediator service is associated with another actual service, and wherein said another actual service exposes another actual operation that is distinct from the actual operation exposed by the actual service; and invoking, at runtime of the application, the abstract operation by sending another invocation message to said another mediator service, wherein, in response to receiving said another invocation message, said another mediator service is configured to:

transform said another invocation message into a format appropriate for invoking said another actual operation exposed by an said actual service; and invoke said another actual operation by sending the transformed version of said another invocation message to said another actual service.

15. The method of claim 14, wherein transforming said another invocation message comprises mapping a first message schema associated with the abstract operation to a second message schema associated with said another actual operation.

16. The method of claim 14, wherein transforming said another invocation message further comprises transforming data values included in said another invocation message into formats expected by said another actual operation.

17. The method of claim 1, wherein the plurality of mediator services and the plurality of actual services are web services.

18. A system for performing dynamic service invocation and dynamic service adaptation in the context of a service-oriented application of a business process execution language (BPEL), the system comprising:

one or more first computer systems configured to run a plurality of mediator services, wherein each mediator service is associated with an actual service in a plurality of actual services, and wherein the plurality of mediator services are configured to expose a common, abstract operation; and a second computer system configured to run the service-oriented application, wherein the application is configured to, at runtime:
  determine a selection of a mediator service in the plurality of mediator services for executing the abstract operation; and
  invoke the abstract operation by sending an invocation message to the selected mediator service, wherein the BPEL process is enabled to dynamically invoke any type of operation exposed by any of the plurality of mediator services, regardless of the abstract operation's name and message schema, and wherein all transformation logic of the BPEL process is encapsulated in the plurality of mediator services such that when a new service is made available or when an interface of an existing service is changed, only the affected of the plurality of mediator services, rather than the BPEL process, is required to be modified, and wherein, in response to receiving the invocation message, the selected mediator service is configured to:
    transform the invocation message into a format appropriate for invoking an actual operation exposed by an actual service associated with the selected mediator service; and
    invoke the actual operation by sending the transformed invocation message to the actual service.

19. The system of claim 18 further comprising:
a third computer system configured to run a decision service, wherein the decision service is configured to:
  receive, from the application, one or more business attributes;
  interoperate with a rules engine to select the mediator service based on the one or more business attributes; and
  send information pertaining to the selected mediator service to the application.

20. A non-transitory machine-readable medium having stored thereon program code for performing dynamic service invocation and dynamic service adaptation in the context of a service-oriented application of a business process execution language (BPEL), the program code comprising:
  code for a plurality of mediator services, wherein each mediator service is associated with an actual service in a plurality of actual services, and wherein the plurality of mediator services are configured to expose a common, abstract operation; and
  code for the service-oriented application, wherein the application is configured to, at runtime:
    determine a selection of a mediator service in the plurality of mediator services for executing the abstract operation; and
    invoke the abstract operation by sending an invocation message to the selected mediator service, wherein the BPEL process is enabled to dynamically invoke any type of operation exposed by any of the plurality of mediator services, regardless of the abstract operation's name and message schema, and wherein all transformation logic of the BPEL process is encapsulated in the plurality of mediator services such that when a new service is made available or when an interface of an existing service is changed, only the affected of the plurality of mediator services, rather than the BPEL process, is required to be modified, and wherein, in response to receiving the invocation message, the selected mediator service is configured to:
      transform the invocation message into a format appropriate for invoking an actual operation exposed by an actual service associated with the selected mediator service; and
      invoke the actual operation by sending the transformed invocation message to the actual service.

* * * * *

UNITED STATES PATENT AND TRADEMARK OFFICE
CERTIFICATE OF CORRECTION

| | | |
|---|---|---|
| PATENT NO. | : 8,271,609 B2 | Page 1 of 1 |
| APPLICATION NO. | : 12/210657 | |
| DATED | : September 18, 2012 | |
| INVENTOR(S) | : Addala et al. | |

It is certified that error appears in the above-identified patent and that said Letters Patent is hereby corrected as shown below:

On sheet 5 of 7, in figure 5, Box 506, line 1, delete "INTIALIZE" and insert -- INITIALIZE --, therefor.

On sheet 5 of 7, in figure 5, Box 508, line 1, delete "INTIALIZE" and insert -- INITIALIZE --, therefor.

In column 5, line 15, after "invention" insert -- . --.

In column 6, line 24, after "102" insert -- is --.

In column 10, line 33, delete "service" and insert -- services --, therefor.

In column 10, line 42, delete "computers" and insert -- computers, --, therefor.

Signed and Sealed this
Eighteenth Day of December, 2012

David J. Kappos
*Director of the United States Patent and Trademark Office*